Oct. 16, 1951            J. LANGER            2,571,900
FILM HANDLING MEANS FOR DEVELOPING TANKS
Filed July 20, 1948            2 SHEETS—SHEET 1
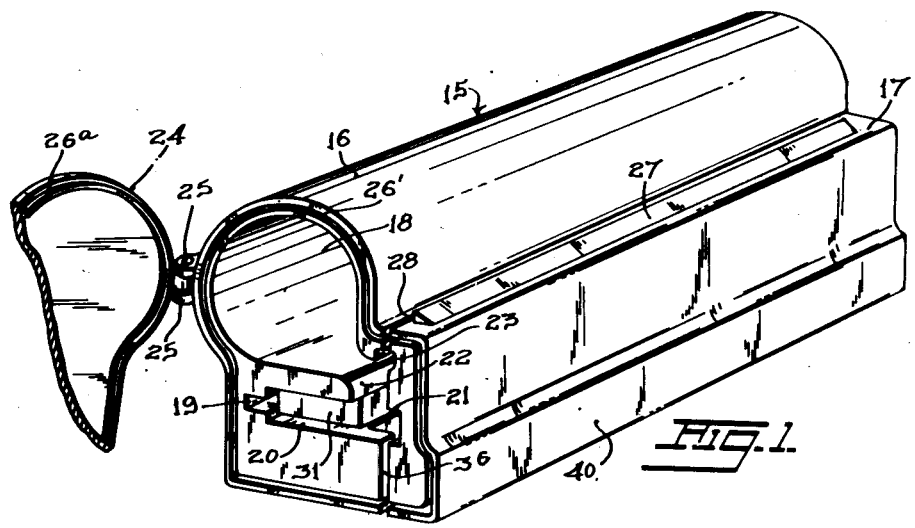
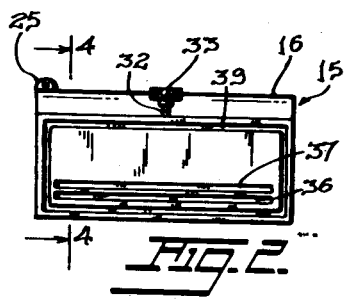
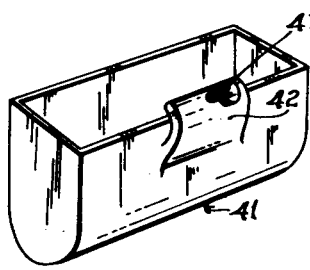
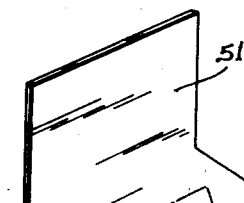
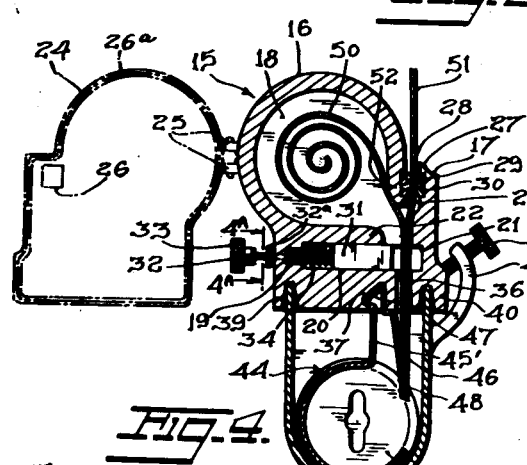
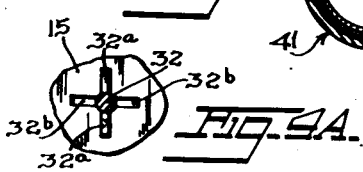
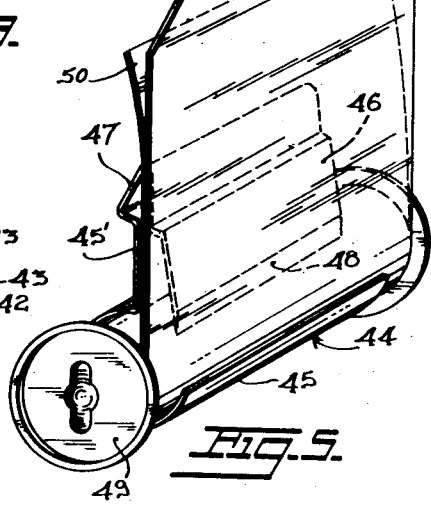
INVENTOR.
JOSEPH LANGER
BY
ATTORNEY Oct. 16, 1951     J. LANGER     2,571,900
FILM HANDLING MEANS FOR DEVELOPING TANKS
Filed July 20, 1948     2 SHEETS—SHEET 2
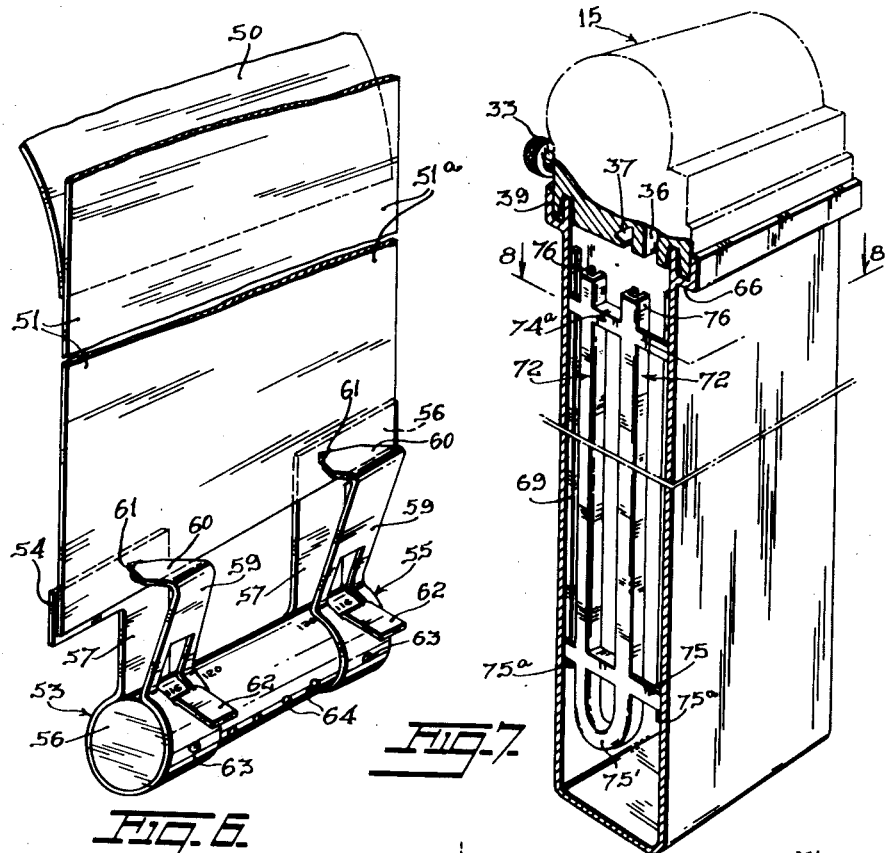
INVENTOR.
JOSEPH LANGER
BY
ATTORNEY Patented Oct. 16, 1951

2,571,900

UNITED STATES PATENT OFFICE 2,571,900

FILM HANDLING MEANS FOR DEVELOPING TANKS

Joseph Langer, Bronx, N. Y.

Application July 20, 1948, Serial No. 39,768

3 Claims. (Cl. 95—100)

1

This invention relates to new and useful improvements in the processing of photographic film, after the same has been exposed, to develop and fix or otherwise treat the film.

The object of the invention is to provide a novel and valuable improvement in such processing, characterized by a relatively simple and inexpensive apparatus, and a series of operations therewith easily and expeditiously performed; with the apparatus adapted to handle film of different widths, and always with the entirety of the loading and processing being able to be done in broad daylight.

According to the invention, saliently, the film ordinarily inter-wound on a film spool with an opaque paper strip is separated from such strip except for one short length of the latter which remains affixed to the film. This short length of the paper strip is that end thereof which is affixed to an end of the film by the film manufacturer incidental to his preparation for the market of the film-spool wound with the film and the opaque strip for use in a camera.

The short length of the paper strip which by the present invention is left affixed to the film moves with the film throughout the operation of loading the film in the processing tank. Thereby the disadvantage of previous proposals, these calling for the attachment of a clip to one end of the film, is done away with.

Such use of a clip is most undesirable, as it renders it necessary to expose a portion of the film. This is extremely dangerous, as anyone who has attempted such procedure will know. According to the present invention, the film never comes in contact with the operator, except when removing the film from the tank after processing.

Also, clips applied to the film often leave sharp edges at piercings of the film and in a position such that they may scratch the emulsion after the film has been rolled up for storage or be used in enlarging machines.

The apparatus of the invention essentially includes a novel film stripping unit, for use with a novel film stripping auxiliary device detachably couplable to said unit for positioning at the exterior thereof, in combination with a cup-like container also detachably couplable to said unit for positioning at the exterior thereof in housing relation to said device and a film spool gripped thereby.

Further according to the invention, after said unit, device and container, all in coupled relation as above, have been used to unwind all of the

2 film from said spool for deposit in a chamber in said unit, and to strip free and discard the entirety of the opaque strip except for the short length thereof above referred to, and so as finally to have said short length, yet no part of the film, protruded from said unit and extended between the latter and the film spool in said device, and this last in a manner to light-trap the film in said chamber, said container may be removed, thereby leaving the said device, the film spool therein and said short opaque paper length accessible for disconnection of said device, severance of said short paper length from the film spool, and removal also of the latter.

By any suitable means, but preferably, and as herein shown, by clip means including a counterweight, and with such clip means engaging merely said short paper length, the film may be drawn into the processing tank; which latter, according to another feature of the invention, is couplable in light-tight manner to the bottom of the film stripping unit whence said short paper length depends.

According to another feature of the invention, means are partially interiorly fixedly carried by the tank and partially present as variably placeable guides therein whereby a coaction may be had between said guides and the clip and counterweight means of the invention such that by certain manipulations of the tank the entirety of the length of the film may be transferred from the film stripping unit and so as to be arranged in the tank in two long stretches U-fashion before introduction into the tank of a processing solution; with the result that this placement of the film in the tank, by endwisely withdrawing the film from the chamber in said unit, may be performed in broad daylight also.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the film stripping unit looking at the open end thereof with the door swung open and partially broken away.

Fig. 2 is, on a reduced scale, a bottom plan view of said unit, with said door omitted.

Fig. 3 is a perspective view of the said cup-like container for being temporarily coupled to the film stripping unit as aforesaid.

Fig. 4 is a transverse vertical section, taken on the line 4—4 of Fig. 2, and showing said unit, with both the container of Fig. 3 and the film stripping auxiliary device of Fig. 5 coupled thereto, and including the door in open position in dot and dash lines.

Fig. 4A is a partial vertical sectional view taken on the line 4A—4A of Fig. 4.

Fig. 5 is an enlarged view in perspective, showing said device, and its use as applied to a film spool gripped therein, for special action relative to the film and the paper strip as simultaneously unreeled from the film spool.

Fig. 6 is a view similar to Fig. 5, but showing a special clip means with a cooperant counterweight, and also showing said clip means attached to the aforesaid short end length of the paper strip left affixed to the film near the last unreeled end portion of the latter and after said strip length has been manually drawn down to suitable dependency below the unit of Fig. 1 following detachment from said unit of the container of Fig. 3.

Fig. 7 is a transverse vertical sectional view, showing the processing tank, on a reduced scale, with the latter now coupled to the film stripping unit of Fig. 1, but with such unit merely partially shown in full lines, in fragmentary cross-section, to simplify the drawing; this view being a section taken substantially on the line 7—7 of Fig. 8.

Fig. 8 is an enlarged horizontal section, taken on the line 8—8 of Fig. 7, and showing the parts of Fig. 6 in association with a complement of film-handling guides and slides inside the tank.

Fig. 9 is a top plan view of the tank, with the said parts of Fig. 6 and said complement of film-handling guides and slides absent.

Fig. 10 is an enlarged partial perspective view of the top portion of one of the slides.

Referring to the drawings more in detail, and first to Figs. 1, 2 and 3, the film stripping unit, according to the present invention, includes a main body 15 shaped exteriorly to include an upper laterally rotund portion 16, and at one lower limit of the portion 16 a shoulder or ledge 17.

The body 15 is hollow, the cavitations thereof including (Fig. 1) a film receiving substantially cylindrical chamber 18, a small horizontal slot 19 of substantially rectangular cross-section, a larger horizontal slot 20 of similar cross-section, a horizontal groove 21 at right angles to said slots and opposite but spaced from the end of the slot 20 remote from the slot 19, a vertically extending throat 22 above the space between the slot 20 and the groove 21, and a groove 23 above and spaced from the throat 22.

These cavitations 17—23 all extend longitudinally of the main body to near the end thereof at the right in Fig. 1. The hollow interior of said main body, at its opposite end, is closable by a swing door 24 hingedly mounted as shown by means including lug elements one carried by the door and two other such elements 25 integral with the main body 15.

This door is shaped so that when it is closed, and secured in closed position as by any suitable latch means as one partially carried on the said main body and partially carried by the door at the location indicated at 26 in Fig. 4, the cavitations 17—23 are all closed at their open ends, and opened when the door 24 is open; and so that such closures will all be light-tight, the end of the main body 15 closed by the door 24 is provided with a groove 26', and the door 24 carries at its inner side a rib 26ª, see Figs. 1 and 4, for fitting nicely within the groove 26' when the door 24 is closed.

Constructed as part of and extended along the ledge 17 there is a tear-off knife 27, alongside which is a narrow slot 28 which communicates with the open end of the main body 15, as shown in Fig. 1. This slot, as shown in Fig. 4, is attended at opposite sides by felt pads 29 and 30, the lower adjacent edges of which are desirably slightly beveled downwardly away from each other. The bottoms of said pads mark the top of the groove 23. The pads 29 and 30 are coextensive with the slot 28, except that they stop at the inner end of the groove 26 which receives the rib 26ª of the door 24.

In the slot 20 is a sliding gate 31, having, offset from the side thereof remote from the groove 21, a pull rod 32 extending laterally of the groove 19 and slidable through a suitable aperture in the main body 15. Beyond the latter the rod 32 fixedly carries a knob 33. This slide is spring-loaded, as by an expansible spring 34 for normally forcing the gate 31 beyond its position shown in Fig. 4 to the limit of its rightward stroke in that view, that is, for entering into the groove 21, when the hub portion of the knob 33 is in abutment with the exterior of said main body.

Intermediate of its ends the rod 32 is formed with pin portions 32ª which extend at right angles from diametrically opposite sides of the rod 32. These pin portions 32ª are arranged to be received in complementary openings 32ᵇ, see Fig. 4A, formed in the side of the main body 15 to permit free movement of the sliding gate 31 to its operative position under the influence of the spring 34. The rod 32 is rotatively connected to the sliding gate 31 and when pulled outward is adapted to be turned to position the projecting pin portions 32ª at right angles to the openings 32ᵇ to releasably retain the sliding gate 31 in a retracted inoperative position against the action of the spring 34.

Also extending longitudinally of the said main body (compare Figs. 4, 2 and 7) is a vertical slot 36, this of uniformly rectangular horizontal cross-section from top to bottom and substantially vertically aligned with the throat 22; and also a slot 37, of half-dovetail shape in cross-section. Each of these slots 36 and 37 extends horizontally of said main body. The slot is of a length appropriate to the maximum width of the film intended to be handled. The slot 36 extends to the open end of the main body below the end of the slot 28, so that film to be processed may be slipped into the main body 15 from the open end thereof, when the door 24 is in its open position.

It will be noted that the main body 15 of the film stripping unit, if constructed as above, may be practically made as a single molding of a suitable plastic; yet the construction of said unit is such that when the door 24 is closed, the only light-admitting opening into the interior of the unit and particularly into the chamber 18 is at the bottom of the slot 36; but, with the knob 33 in normal position, that is, manually released, light admission by way of said slot 36 is cut off by the slide gate 31.

The main body 15, at its bottom and along its length at its side adjacent to the slots 36 and 37, has an offset extension 40.

Referring next primarily to Fig. 3, a cup-like container 41, for the lower portion of the device of Fig. 6, and for the wound film spool (as shown in Fig. 4), has an upper rim for fitting in a light-tight manner in a groove 39 (Fig. 2) on the bottom of the main body 15. The container 41 carries, suitably fixed to one side thereof, a bracket 42 drilled and tapped at its upper end for taking a downwardly and inwardly inclined set-screw 43; so that when the container is temporarily coupled to said main body 15, as shown in Fig. 4, the set-screw 43 may be tightened to grip down on the extension 40 and so lock the container 41 in a light-tight manner to and below the main body 15 with the top edges of the container 41 securely seated in the groove 39.

Preparatory to this coupling of the parts 15 and 41, the film strip auxiliary device of Fig. 5 is brought into use.

This device, as a whole marked 44, is a spring steel member, curvilinearly shaped across one end thereof to provide a spring-grip holder 45 of arcuate cross-section, such are approximately about 180°. Upwardly extended from said holder the remainder of the member 44 is bent on itself at a plurality of points as shown to provide a double-wall structure incorporating a rising rear wall 45', a depending front wall 46 and an intervening top formation 47 elastically biased to a half-dovetail cross-section such that said formation will fit tightly in the half-dovetail slot 37 in the bottom of the main body 15; the parts 45—47 providing what may be called the elastically collapsible attaching arm for the film stripping auxiliary device 44.

With said arm of the normally resiliently maintained hollow shape shown, the same may be upwardly sidewisely inserted into said slot 37, incidental to partial temporary collapse of said arm by manually squeezing the walls 45' and 46 toward each other. When said walls are relieved of said squeeze, they elastically spring apart to lock the formation 47 in the slot 37.

Such coupling of the device 44 with the unit 15, however, is best done after the film spool, with the same having fully wound thereon its exposed and yet to be developed film 50, and also the inter-convoluted opaque paper strip (except, in the case of said strip, for a short terminal length thereof), is placed in the spring-grip holder, as shown in Fig. 5; it being noted at this point that across the bottom of the wall 46 of the device 44, said wall, on the side thereof remote from the wall 45', has a long gentle bevel as indicated at 48—this beveled wall portion at its under side for bearing down on the exterior of the coiled portion of the paper strip.

In Fig. 5, and elsewhere in the drawings, the spool is marked 49, the film 50, and the opaque paper strip 51.

Before coupling the device 44 with the main body 15, the spool 49 is centered relative to the length of the holder 45 of the auxiliary device 44. This having been done, the operator manually grasps the short end length of the paper strip 51 (this the short terminal length thereof parenthetically mentioned in the second preceding paragraph), and pulls approximately three inches of said strip off the roll 49. Such preliminary further withdrawal of the strip 51 is substantially as indicated in Fig. 5; but the extent of extra length of the strip 51 over that of the film 50 is always such as to insure that said withdrawal of the strip 51 has not yet brought any of the film 50 out of its light-tight inter-coiling with said strip. (In Fig. 4, the film 50, also, is shown as partially withdrawn; but this film withdrawal occurs later, as will be understood from what follows.)

The above preliminaries having been completed, and the attaching arm 45'—47 of the auxiliary device 44 having been temporarily entered into lock engagement with the slot 37 of the main body 15 as above explained, the upper end of the withdrawn part of the paper strip 51 is inserted upwardly into the slot 36, thence through the space between the slot 20 and the groove 21, thence through the throat 22, thence up into the groove 23 and thence upward through the light-trap provided by the felt pads 29 and 30 and so finally for slight protrusion through the slot 28.

During this threading of the paper strip 51 through the main body 15, the knob 33 is pulled out and locked, to hold retracted the sliding gate 31, as shown in Fig. 4; thereby to maintain open the space between the slot 20 and the groove 21.

Now the container 41 is detachably coupled with the main body 15, as already explained, and as shown in Fig. 4.

This having been done, and the door 24 of the unit 15 having, of course, been closed, the operator pulls upward on the paper strip 51 where protruded above the slot 28. Shortly after this procedure is started, the film 50 will begin to be also unreeled from the spool 49, and said film, due to its tendency to recoil itself, will diverge in its upward path of travel from the upward path of travel of the paper strip 51, and so advance up along the wall 46 of the device 44, as shown in Fig. 5.

With the paper strip 51 continued to be withdrawn through the slot 28, the film 50 is advanced also upward through the main body 15, and, its leading end entering the chamber 18, recoils itself more or less loosely in said chamber.

The operator continues his upward pull on the paper strip 51 until a definite drag resistance is felt. This means that the paper strip 51 and the film 50 have been so far unreeled from the spool 49 that their junction point, where they were cemented together by the manufacturer, straddles a rib-like depending formation in the main body 15 between the chamber 18 and the groove 23—as shown in Fig. 4, where the rib-like depending formation is marked 52.

Thereupon the operator tears off, at the knife 27, the withdrawn considerable length of the paper strip 51, and discards the same; and he releases the knob 33, which results in the spring-loaded gate 31 snapping forward and so acting to press the short remaining length of the paper strip below said junction point into groove 21, thus again completely light-sealing the main body 15, regardless of retention or removal of the container 41.

Now, the set-screw 43 having been loosened, the container 41 is removed, thereby to leave hanging from the bottom of the unit 15 the film stripping auxiliary device 44; and the operator may remove said device by squeezing its wall 46 toward its wall 45' to collapse the attaching arm 45'—47 sufficiently to allow downward withdrawal of the formation 47 from the groove 37, after which he may remove the spool 49 from the holder 45 and sever the paper strip 51 about half an inch from its securement to the spool. Thus the aforesaid short end length of the strip 51 is left depending below the slot 36 at the bottom of the main body 15. This short end length of the strip is marked 51ª in Fig. 6.

Still referring to Fig. 6, the operator applies to the strip length 51ª, as there illustrated, the two clips there shown. These clips are duplicates, except that one is left hand and the other right hand so far as are concerned upper horizontal ears carried thereby. One of said clips as a whole is marked 53, having its said ear arranged as at 54; and the other clip as a whole is marked 55, having its said ear arranged at at 56. These clips form part of a combined clip means and counterweight unit; which counterweight, marked 56, is shown as cylindrical, and can be made of porcelain or some suitable material or materials inert to film processing chemicals.

The clips 53 and 55 may be made of stainless steel or other resilient sheet material inert to the processing chemicals; and they are further formed, as shown in Fig. 6, and as will be explained in connection particularly with the clip 53, to include a main strip portion incorporating a downward length 57, a curled length 58 for almost completely elastically embracing an end portion of the counterweight 56, and an upwardly extending length 59 terminally rearwardly bent at its top to provide a bluntly pointed prong 60, opposite which prong the clip is apertured as at 61.

By means of the parts 60 and 61 of the clip 53 and the corresponding parts of the clip 55, these clips may be securely attached to the paper strip length 51ᵃ as shown in Fig. 6. Also as there shown, the clip 53 has a tongue 62 struck out from the same, and somewhat below said tongue an inwardly directed dimple 63 is formed on the curved length 58 of the clip; and the clip 55 has elements corresponding to the elements 62 and 63 of the clip 53.

Said tongues of the two clips are to facilitate manually springing open their curved lengths for reception of the counterweights 56. The latter, as long as the smallest width of film intended to be processed, has a series of indentations 64, and is calibrated for standard film width (116 and 120) as shown; each of said calibrations having in line therewith one of the indentations 64.

Thus the counterweight can be readily secured in the clips in centralized relation thereto, and so as to predetermine that the paper strip may be gripped by the clips with the outer end of the ear 54 at one side of the paper strip and with the outer end of the corresponding ear of the clip 55 at the other side of the paper strip, whatever be the width of the paper strip of the film which is to be processed.

Referring now to Figs. 7-9, the processing tank, marked as a whole 65, is a deep hollow one having all around the open top thereof a formation 66 U-shaped in cross-section and shaped and arranged for interfitting engagement as shown in Fig. 7 with the bottom of the main body 15, thereby to provide a light-tight coupling between the tank 65 and the main body 15; which coupling may be made temporarily disengageable in any suitable way, as by split spring rings or suitable spring or other clamps of any suitable type.

As best shown in Fig. 9, each of the side walls 67 and 68 of the tank 65 is provided with internal vertical ribs; these ribs being in three sets. On such rib set includes a pair of ribs 69 on the wall 67 and an opposite pair of ribs 69' on the wall 68; another such rib set includes a pair of ribs 70 on the wall 67 and an opposite pair of ribs 70' on the wall 68; and the third rib set includes a pair of ribs 71 on the wall 67 and an opposite pair of ribs 71' on the wall 68. These ribs all extend from close to the bottom to close to the top of the tank.

While the tank 65 shown in Figs 7 to 9 is illustrated as being formed with three sets for tracks for receiving standard 120, 620 and 116, 616 films this is by way of illustration only. The inside walls of the tank, if desired can be formed with additional sets of tracks for additional receiving 35 mm. or standard 127 film or films of other widths.

Referring now to Figs. 7 and 8, a pair of slides 72 and 73 are provided. These slides are alike, and it will suffice to describe one thereof, as the slide 72. The latter is of skeletal construction, having an uper cross-member 74 and a lower cross-member 75, these suitably secured to a channel track 76 of U-shaped in longitudinal extension as shown best in Fig. 7. The bend 75' of the U-shaped track is for placement near the bottom of the tank 65 as shown in Fig. 7.

These slides are shown as so placed in the tank 65 that the end portions of the cross-bars 74 and 75 of the slide 72 are entered into the spaces between the pairs of ribs 69 and 69', and so that the end portions of the corresponding cross-members of the slide 73 are entered into the spaces between the pairs of ribs 71 and 71'. This placement of the slides would correspond, for instance, to a set up for processing in the tank a standard 116 or 616 film. Were the film to be processed in a standard 120 or 620 film, one slide 72 or 73 would be arranged in the guideways provided by the rib pairs 70 and 70', and the other slide would be arranged in the guideways provided by the rib pairs 71 and 71'.

Small blocks 75ᵃ are provided within the pairs of ribs, see Figs. 7 and 8, against which the lower edges of the lowermost cross-members 75 of the slides are adapted to abut and hold the bottom of the slides spaced above the top wall of the tank 65 to provide a clearance for the weight 56, which will become clear as this specification proceeds.

With the slides 72 and 73 in the tank 65 as shown in Figs. 7 and 8, the parts assembled in Fig. 6 as already described are lowered into the top of the tank to a sufficient extent to position the outer end of the ear 54 of the clip 53 in the channel track 75 of the slide 72 and the outer end of the corresponding ear 56 of the clip 55 in a corresponding portion of the channel track of the slide 73; as, for instance, indicated in Fig. 8. As the procedure has so far been described, the parts of Fig. 6 are very near the tops of said channel tracks, that is, inserted into the tank only to an extent permitted by the extent of dependency of said parts of Fig. 6 as now suspended below the unit 15 and there held by grip of the slide gate 31 on the strip 51 at the groove 21.

When the unit 15 is coupled to the tank 65 as already explained and as shown in Fig. 7, the knob 33 is pulled out and locked, releasing pressure of the gate 31 on the paper strip 51 at the groove 21. Thereupon, the counterweight 56 drops down in the slides 72 and 73 to the bottom of the tank, thereby correspondingly pulling down the short length (51ᵃ, Fig. 6) of the paper strip, and with it, the film 50, due to the aforesaid cementing or gumming together of said strip and the film.

The coupled, and as aforesaid inter-secured, unit 15 and tank 65 are now rotated through 90°, so that the side walls 67 and 68 of the tank are horizontal and so as to cause the counterweight to advance through the curvilinear path defined by the bend 75' of the channel track 75 and the corresponding bend of the channel track of the slide 73. Thereafter, as the tank is further rotated in the same direction, the counterweight will complete said curvilinear path, and then, as the tank is turned upside down, the counterweight again descends through a distance measured substantially by the depth of the tank but with the ear 54 of the clip 53 and the corresponding ear 56 of the clip 55 now travelling along the channel tracks seen toward the bottom of Fig. 8.

When this further travel of the counterweight 56 has been completed, the tank once more is rotated through 90°, again in the same direction as before, so that the counterweight may come to rest at a position across the top of the tank with the opposite ends of the counterweight between the upper ends of the limbs of the two channel tracks. The top cross bars 74 have thickened portions 74ª, see Figs. 8 and 10, between the upper ends of the limbs of the channel tracks upon which the ends of the ears 54 and 56 rest to support the clips 53 and 55 and the weight 56 during processing of the film.

On now further rotating the tank, also in the same direction as before, to arrange the tank vertical and with its bottom lowermost, the counterweight 56 may further drop to increase the length of film contained in the tank. According to a convenient depth selected for the tank, if such depth be great enough, the last-described drop of the counterweight need not be availed of; and instead, a suitable trough-like receptor for the counterweight, after it leaves the channel tracks at the top of the tank, may be provided.

In either case, the film over its complete length, attached near one end to the paper strip length 51ª (Fig. 6), is strung through the tank for efficient processing. The operator pours the necessary processing chemicals into the tank through a top lip 81, which also serves as a pour-out spout. A suitable opening is provided, at the bottom of the lip 81, which bottom, indicated at 82 in Fig. 9, is below the tank's top formation 66, for admission of the processing solutions into the tank. Said opening is also indicated in Fig. 9, at 83, since no light enters through the labyrinthine passage provided by the lip 81 and the opening 83 that its effect is negligible.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. Weight means for drawing a film to be developed down between a spaced pair of channel-shaped tracks adjustably mounted within a developing tank, comprising an elongated weight positioned between the tracks, clips slidably positioned on the ends of said weight to be engaged with the end of the film, means for holding said clips in desired laterally shifted positions on said weight in accordance with the spacings of the tracks and the width of the film to be processed, and laterally projecting ears formed on said clips and slidably disposed in the tracks.

2. Weight means for drawing a film to be developed down between a spaced pair of channel-shaped tracks adjustably mounted within a developing tank, comprising an elongated weight positioned between the tracks, clips slidably positioned on the ends of said weight to be engaged with the end of the film, and laterally projecting ears formed on said clips and slidably disposed in the tracks, said clips having portions engaged substantially completely around said weight, an inwardly projected dimple formed on each of the portions of said clips which are engaged substantially completely around said weight, and a row of indentations formed on said weight to be selectively engaged by said dimples for holding said clips in desired adjusted positions on said weight in accordance with the spacing of the tracks and the width of the film to be developed.

3. Weight means for drawing a film to be developed down between a spaced pair of channel-shaped tracks adjustably mounted within a developing tank, comprising an elongated weight positioned between the tracks, clips mounted on the ends of said weight to be engaged with the end of the film, each of said clips having a pair of upwardly extending lengths having their top ends spaced to receive between the adjacent faces thereof the projected end of the film to be developed, one of said lengths of each of said clips being formed with an aperture, the other of said lengths of each of said clips having its free end bent toward the apertured length and formed with a bluntly pointed prong to engage the respective aperture after passing through the projected end of the film to be developed, and ears extended laterally from the top ends of the apertured upwardly extending lengths of said clips and slidably disposed in said tracks.

JOSEPH LANGER.

REFERENCES CITED

The following references are of record in the file of this patent:

UNITED STATES PATENTS

| Number | Name | Date |
|---|---|---|
| 1,044,433 | Bell | Nov. 12, 1912 |
| 1,463,710 | Matson | July 21, 1923 |
| 2,082,962 | Lesjak et al. | June 8, 1937 |
| 2,099,159 | Busse | Nov. 16, 1937 |
| 2,169,417 | Hill et al. | Aug. 15, 1939 |
| 2,203,963 | Lange | June 11, 1940 |
| 2,403,717 | Harvey | July 9, 1946 |

FOREIGN PATENTS

| Number | Country | Date |
|---|---|---|
| 604,960 | France | Feb. 8, 1926 |
| 503,674 | Germany | July 25, 1930 |
| 595,381 | Germany | Apr. 11, 1934 |
| 799,862 | France | Apr. 20, 1936 |